United States Patent
Bunazawa et al.

(10) Patent No.: US 11,915,536 B2
(45) Date of Patent: Feb. 27, 2024

(54) ANOMALY DETERMINATION APPARATUS

(71) Applicant: TOYOTA JIDOSHA KABUSHIKI KAISHA, Toyota (JP)

(72) Inventors: Hideaki Bunazawa, Nagoya (JP); Tetsuya Yoshikawa, Toyota (JP); Kei Yuasa, Toyota (JP); Kenichi Yamaguchi, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 415 days.

(21) Appl. No.: 17/372,608

(22) Filed: Jul. 12, 2021

(65) Prior Publication Data
US 2022/0044502 A1  Feb. 10, 2022

(30) Foreign Application Priority Data

Aug. 4, 2020  (JP) ................. 2020-132247

(51) Int. Cl.
| | |
|---|---|
| G07C 5/08 | (2006.01) |
| F16H 61/12 | (2010.01) |
| G06N 5/04 | (2023.01) |
| G06N 20/00 | (2019.01) |
| G07C 5/04 | (2006.01) |
| B60T 17/22 | (2006.01) |

(52) U.S. Cl.
CPC ........... G07C 5/0808 (2013.01); F16H 61/12 (2013.01); G06N 5/04 (2013.01); G06N 20/00 (2019.01); G07C 5/04 (2013.01); G07C 5/085 (2013.01); B60T 17/22 (2013.01)

(58) Field of Classification Search
CPC ................................................. G07C 5/0808
See application file for complete search history.

(56) References Cited

U.S. PATENT DOCUMENTS

| | | | |
|---|---|---|---|
| 7,945,397 B2* | 5/2011 | Kar ...................... | G01M 13/021 |
| | | | 702/34 |
| 10,375,098 B2* | 8/2019 | Oliner ...................... | G06N 5/01 |
| 2010/0256932 A1 | 10/2010 | Kar | |
| 2022/0041174 A1* | 2/2022 | Bunazawa ............. | B60K 6/445 |
| 2022/0042842 A1* | 2/2022 | Bunazawa ................ | F16H 7/08 |
| 2022/0044502 A1* | 2/2022 | Bunazawa ........... | G07C 5/0808 |

FOREIGN PATENT DOCUMENTS

| | | |
|---|---|---|
| CN | 102449457 A | 5/2012 |
| JP | 2011-079489 A | 4/2011 |

* cited by examiner

*Primary Examiner* — Michael A Berns
(74) *Attorney, Agent, or Firm* — Oliff PLC

(57) ABSTRACT

An anomaly determination apparatus for a vehicle that includes a transmission includes an execution device and a memory device. The memory device is configured to store map data that defines pre-trained map, which has been trained through machine learning. When a variable representing time-series data of a rotation speed of a gear is fed to the map as an input variable, the map outputs a state variable representing a state of the gear as an output variable. The execution device is configured to execute: an obtaining process that obtains the variable representing the time-series data as a value of the input variable; and a determination process that determines whether there is an anomaly in the transmission based on a value of the output variable that is output by the map when the value of the input variable is fed to the map.

21 Claims, 5 Drawing Sheets

| y (0) | No anomaly (Normal) |
| y (1) | Gear damaged |
| y (2) | Rattling Noise Generated |
| y (3) | Whining Noise Generated |

ANOMALY DETERMINATION APPARATUS

BACKGROUND

1. Field

The present disclosure relates to an anomaly determination apparatus that determines whether there is an anomaly in a transmission, which transmits power using gears.

2. Description of Related Art

Japanese Laid-Open Patent Publication No. 2011-79489 discloses a diagnosing apparatus that detects an anomaly of a drive mechanism including gears. The drive mechanism is used as a mechanism that winds up the webbing of a seat belt. The diagnosing apparatus detects an extracted amount of the webbing and determines that there is an anomaly in the drive mechanism when the extracted amount exceeds a predetermined amount.

When determining an anomaly in a manner similar to that of the diagnosing apparatus disclosed in the above-described publication, it is possible to detect an anomaly that can be identified based on the fact that the detection value at a certain point in time exceeds a predetermined threshold. However, when the detection value remains less than the threshold, there may be an anomaly if the fluctuation range of the detection value is greater than or less than that when there is no anomaly. An anomaly of a detection value with such features cannot be detected by an apparatus that performs determination in a manner by the diagnosing apparatus disclosed in the above-described publication.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present disclosure will now be described.

Aspect 1: An anomaly determination apparatus for a vehicle that includes a transmission, which transmits power using a gear, is provided. The anomaly determination apparatus includes an execution device and a memory device. The memory device is configured to store map data. The map data defines a pre-trained map. The pre-trained map has been trained through machine learning. When a variable representing time-series data of a rotation speed of the gear is fed to the map as an input variable, the map outputs a state variable representing a state of the gear as an output variable. The execution device is configured to execute an obtaining process and a determination process. The obtaining process obtains the variable representing the time-series data as a value of the input variable. The determination process determines whether there is an anomaly in the transmission based on a value of the output variable that is output by the map when the value of the input variable is fed to the map.

When there is an anomaly in the transmission due to failure of the gear, the time-series data of the rotation speed of the gear is predicted to exhibit a feature different from that when there is no anomaly in the transmission.

The above-described configuration feeds the variable representing the time-series data of the rotation speed of the gear to the map, so that the state variable representing the state of the gear is output. The state of the gear is thus determined based on the variable representing the time-series data of the rotation speed of the gear. That is, it is possible to determine whether there is an anomaly in the transmission by extracting a feature that cannot be captured from the magnitude of the rotation speed of the gear alone based on the time-series data of the rotation speed.

Aspect 2: In the anomaly determination apparatus of Aspect 1, the execution device is configured to execute a feature quantity calculating process that calculates a feature quantity obtained by processing the time-series data. The obtaining process includes obtaining the feature quantity as the value of the input variable. The feature quantity calculating process includes dividing values of the rotation speed included in the time-series data into classes according to a magnitude of the rotation speed, and calculating a frequency of each class as the feature quantity.

The above-described configuration processes the time-series data of the rotation speed into a feature quantity representing a frequency distribution. It is thus easy to discriminate between the feature exhibited by the time-series data of the rotation speed when there is an anomaly in the gear and the feature exhibited by the time-series data of the rotation speed when there is no anomaly in the gear. That is, the above-described configuration improves the accuracy of determination as to whether there is an anomaly in the transmission.

Aspect 3: In the anomaly determination apparatus of Aspect 2, the feature quantity calculating process includes a process that normalizes the time-series data such that a maximum value of the gear rotation speed is 1, and a minimum value of the gear rotation speed is 0.

The above-described configuration normalizes the time-series data to determine the state of the gear by capturing fluctuations in the rotation speed as a feature exhibited by the time-series data, without being influenced by the magnitude of the absolute value of the rotation speed.

Aspect 4: In the anomaly determination apparatus of Aspect 1, the execution device is configured to execute a feature quantity calculating process that calculates a feature quantity obtained by processing the time-series data. The obtaining process includes obtaining the feature quantity as the value of the input variable. The feature quantity calculating process includes calculating, as the feature quantity, a distribution of a frequency component obtained by subjecting the time-series data to fast Fourier transform.

The above-described configuration is capable of determining the state of the gear based on the feature of the time-series data appearing in a frequency domain.

Aspect 5: In the anomaly determination apparatus of Aspect 4, the feature quantity calculating process includes calculating a primary frequency based on an average value of the rotation speed in the time-series data, normalizing the frequency component with reference to the primary frequency.

The above-described configuration normalizes the frequency component to determine the state of the gear based on the feature exhibited by the time-series data of the rotation speed, without being influenced by the intensity of the frequency component.

Aspect 6: In the anomaly determination apparatus of Aspect 4 or 5, the feature quantity calculating process includes dividing a frequency domain into multiple frequency bands, and using an average value of an intensity of the frequency component in each frequency band as the intensity of the frequency component in that frequency band.

The above-described configuration reduces the elements of the input variable. This reduces the calculation load in the determination process.

Aspect 7: In the anomaly determination apparatus of any one of Aspects 1 to 6, the time-series data is calculated based on a detection signal of a rotation speed sensor that detects a rotation speed of the gear.

Aspect 8: In the anomaly determination apparatus of any one of Aspects 1 to 6, the time-series data is calculated based on a vehicle speed of the vehicle.

Aspect 9: In the anomaly determination apparatus of any one of Aspects 1 to 8, the input variable includes a variable that represents a magnitude of a torque transmitted by the gear.

The above-described configuration feeds, to the map, the variable representing the magnitude of the torque as the input variable, in addition to the variable representing the time-series data. Feeding different types of variables to the map improves the accuracy of determination as to whether there is an anomaly in the transmission.

Aspect 10: In the anomaly determination apparatus of any one of Aspects 1 to 9, the input variable includes a variable that represents a temperature of a hydraulic fluid in the transmission.

The above-described configuration improves the accuracy of determination as to whether there is an anomaly in the transmission.

Aspect 11: In the anomaly determination apparatus of any one of Aspects 1 to 10, the input variable includes a variable that represents a dimension of the gear based on a specification of the gear.

The above-described configuration improves the accuracy of determination as to whether there is an anomaly in the transmission.

Aspect 12: In the anomaly determination apparatus of any one of Aspects 1 to 11, the input variable includes a variable that represents a meshing error of the gear.

The above-described configuration performs the determination process, while taking into consideration the influence of errors in the tooth shapes on the time-series data of the rotation speed. This improves the accuracy of determination as to whether there is an anomaly in the transmission.

Aspect 13: In the anomaly determination apparatus of any one of Aspects 1 to 12, the input variable includes a variable that represents a backlash when the gear is meshed.

The above-described configuration performs the determination process, while taking into consideration the influence of backlash on the time-series data of the rotation speed. This improves the accuracy of determination as to whether there is an anomaly in the transmission.

Aspect 14: In the anomaly determination apparatus of any one of Aspects 1 to 13, the input variable includes a variable that represents a detection value of a vibration sensor that detects vibration.

The above-described configuration improves the accuracy of determination as to whether there is an anomaly in the transmission.

Aspect 15: In the anomaly determination apparatus of any one of Aspects 1 to 14, the input variable includes a variable that represents a detection value of a sound sensor that detects sound.

The above-described configuration improves the accuracy of determination as to whether there is an anomaly in the transmission.

Aspect 16: In the anomaly determination apparatus of any one of Aspects 1 to 15, the input variable includes a variable that represents a fluid pressure in a brake system of the vehicle.

The above-described configuration performs the determination process, while taking into consideration the fluctuation of the time-series data of the rotation speed that accompanies deceleration of the vehicle. This improves the accuracy of determination as to whether there is an anomaly in the transmission.

Aspect 17: In the anomaly determination apparatus of any one of Aspects 1 to 16, the input variable includes a variable that represents a traveled distance of the vehicle.

The above-described configuration improves the accuracy of determination as to whether there is an anomaly in the transmission.

Aspect 18: In the anomaly determination apparatus of any one of Aspects 1 to 17, the state variable includes a variable that represents a state in which the gear is damaged.

The above-described configuration is capable of determining whether the gear is in a damaged state. It is thus possible to detect anomalies of causes in different categories.

Aspect 19: In the anomaly determination apparatus of any one of Aspects 1 to 18, the state variable includes a variable that represents a state in which a rattling noise is generated as the gear rotates.

The above-described configuration is capable of determining whether the transmission is in a state in which a rattling noise is generated. It is thus possible to detect anomalies of causes in different categories.

Aspect 20: In the anomaly determination apparatus of any one of Aspects 1 to 19, the state variable includes a variable that represents a state in which a whining noise is generated as the gear rotates.

The above-described configuration is capable of determining whether the transmission is in a state in which a whining noise is generated. It is thus possible to detect anomalies having causes in different categories.

Aspect 21: In the anomaly determination apparatus of any one of Aspects 1 to 17, the map is a first map that outputs, as an output variable, a state variable indicating whether the gear is damaged when fed with the input variable. The map data is first map data that defines the first map. The determination process is a first determination process. The memory device is configured to further store second map data and third map data. Each of the second map data and the third map data defines a pre-trained map. The pre-trained map has been trained through machine learning. The second map data defines a second map. When fed with the input variable, the second map outputs, as an output variable, a state variable indicating whether the gear is in a state in which a rattling noise is generated as the gear rotates. The third map data defines a third map. When fed with the input variable, the third map outputs, as an output variable, a state variable indicating whether the gear is in a state in which a whining noise is generated as the gear rotates. The execution device is configured to execute a second determination process and a third determination process. The second determination process determines whether there is an anomaly in the transmission based on a value of the output variable that is output by the second map when the value of the input variable is fed to the second map. The third determination process determines whether there is an anomaly in the transmission based on a value of the output variable that is output by the third map when the value of the input variable is fed to the third map.

For example, the time-series data when a rattling noise is generated is different from the time-series data when a whining noise is generated. Using a single map to discriminate between multiple states of the gear may increase the calculation load on the execution device or reduce the accuracy of determination.

The above-described configuration uses the first map for detecting whether the gear is in a damaged state, the second map for detecting whether a rattling noise is generated, and the third map for detecting whether a whining noise is generated. The configuration thus reduces the calculation load on the execution device as compared to a case in which a single map is used to determine the state of the gear. Also, the configuration prevents reduction in the accuracy of determination as to whether there is an anomaly in the transmission as compared to a case in which a single map is used to determine the state of the gear.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment will now be described with reference to the drawings.

Figure 1:
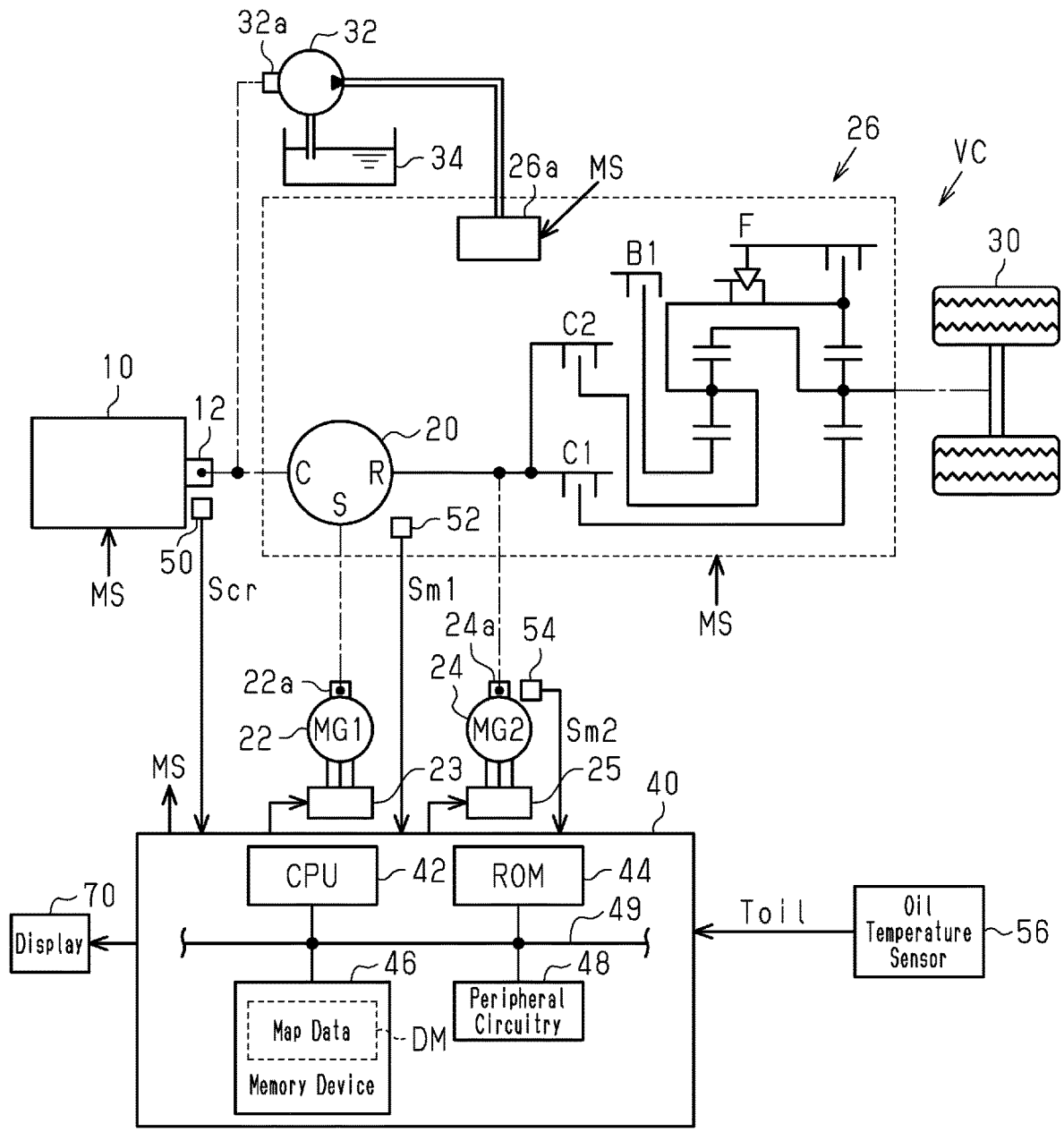
FIG. 1 is a diagram showing the configuration of a vehicle and a controller according to a first embodiment.

As shown in FIG. 1, a vehicle VC includes an internal combustion engine 10, a first motor-generator 22, and a second motor-generator 24. The internal combustion engine 10 includes a crankshaft 12, which is mechanically coupled to a power splitter 20. The power splitter 20 splits power of the internal combustion engine 10, power of the first motor-generator 22, and power of the second motor-generator 24. The power splitter 20 includes a planetary gear mechanism, which includes carrier C, a sun gear S, and a ring gear R. The carrier C is mechanically coupled to the crankshaft 12. The sun gear S is mechanically coupled to a rotary shaft 22a of the first motor-generator 22. The ring gear R is mechanically coupled to a rotary shaft 24a of the second motor-generator 24. Output voltage of a first inverter 23 is applied to terminals of the first motor-generator 22. Output voltage of a second inverter 25 is applied to terminals of the second motor-generator 24.

The ring gear R of the power splitter 20 is mechanically coupled to driven wheels 30 via a transmission 26 as well as to the rotary shaft 24a of the second motor-generator 24. The transmission 26 is designed to transmit power to the driven wheels 30 by means of combinations of gears.

The carrier C of the power splitter 20 is mechanically coupled to a driven shaft 32a of an oil pump 32. The oil pump 32 is designed to circulate oil in an oil pan 34 to the power splitter 20 as lubricant and deliver the oil to the transmission 26 as hydraulic fluid. The pressure of the hydraulic fluid delivered from the oil pump 32 is regulated by a hydraulic control circuit 26a in the transmission 26.

A controller 40 is configured to control the internal combustion engine 10. The controller 40 corresponds to an anomaly determination apparatus for the vehicle VC, which includes the transmission 26, which transmits power using gears. The controller 40 operates various operated units of the internal combustion engine 10, thereby controlling controlled variables, such as the torque and the ratios of exhaust components of the internal combustion engine 10. Also, the controller 40 is configured to control the first motor-generator 22. The controller 40 operates the first inverter 23 to control controlled variables such as the torque and the rotation speed of the first motor-generator 22. Also, the controller 40 is configured to control the second motor-generator 24. The controller 40 operates the second inverter 25 to control controlled variables such as the torque and the rotation speed of the second motor-generator 24. FIG. 1 shows operations signals MS, which are delivered by the controller 40 to control the internal combustion engine 10 and/or the transmission 26.

When controlling the above-described controlled variables, the controller 40 refers to an output signal Scr of a crank angle sensor 50, an output signal Sm1 of a first rotation angle sensor 52, which detects a rotation angle of the rotary shaft 22a of the first motor-generator 22, and an output signal Sm2 of a second rotation angle sensor 54, which detects a rotation angle of the rotary shaft 24a of the second motor-generator 24. Also, the controller 40 refers to an oil temperature Toil detected by an oil temperature sensor 56.

The controller 40 includes a CPU 42, ROM 44, a memory device 46, which is a nonvolatile memory that can be electrically rewritten, and peripheral circuitry 48. The CPU 42, the ROM 44, the memory device 46, which is a non-volatile memory that can be electrically rewritten, and the peripheral circuitry 48 can communicate with one another through a local network 49. The peripheral circuitry 48 includes a circuit that generates a clock signal regulating internal operations, a power supply circuit, and a reset circuit. The controller 40 controls the above controlled variables by causing the CPU 42 to execute programs stored in the ROM 44.

Part of the processes executed by controller 40 will now be described.

The controller 40 is configured to execute a driving torque setting process. The driving torque setting process calculates a driving torque command value Trq*, which is a command value of the torque to be delivered to the driven wheels 30. The driving torque command value Trq* is calculated using, as an input, the operated amount of an accelerator operating member of the vehicle VC, so as to be a greater value as the operated amount increases.

The controller 40 is configured to execute a driving force distribution process. Based on the driving torque command value Trq*, the driving force distribution process sets a torque command value Trqe* for the internal combustion engine 10, a torque command value Trqm1* for the first motor-generator 22, and a torque command value Trqm2* for the second motor-generator 24. The torque command values Trqe*, Trqm1*, and Trqm2* are respectively generated by the internal combustion engine 10, the first motor-generator 22, and the second motor-generator 24, such that the torque delivered to the driven wheels 30 becomes a torque of the driving torque command value Trq*.

The controller 40 is configured to execute a rotation speed calculating process. The rotation speed calculating process calculates a gear rotation speed Ngear, which is the rotation speed of a gear in the transmission 26. The gear rotation speed Ngear is calculated based on the output signal Sm1. The gear rotation speed Ngear is calculated at predetermined time intervals. Changes over time of the gear rotation speed Ngear are stored in the memory device 46 as time-series data of the gear rotation speed Ngear. For example, the gear rotation speed Ngear is calculated as the rotation speed of a driven gear that is located at the position closest to the driven wheels 30 on the path along which power is transmitted to the driven wheels 30. The gear rotation speed Ngear may be the rotation speed of a driving gear that is meshed with the driven gear. The gear rotation speed Ngear does not necessarily need to be the rotation speed of the gear located at the position closest to the driven wheels 30. That is, the gear rotation speed Ngear may be the rotation speed of any gear in the transmission 26.

The controller 40 is configured to execute a process of determining an anomaly of the gear of the transmission 26. This process will now be described.

Figure 2:
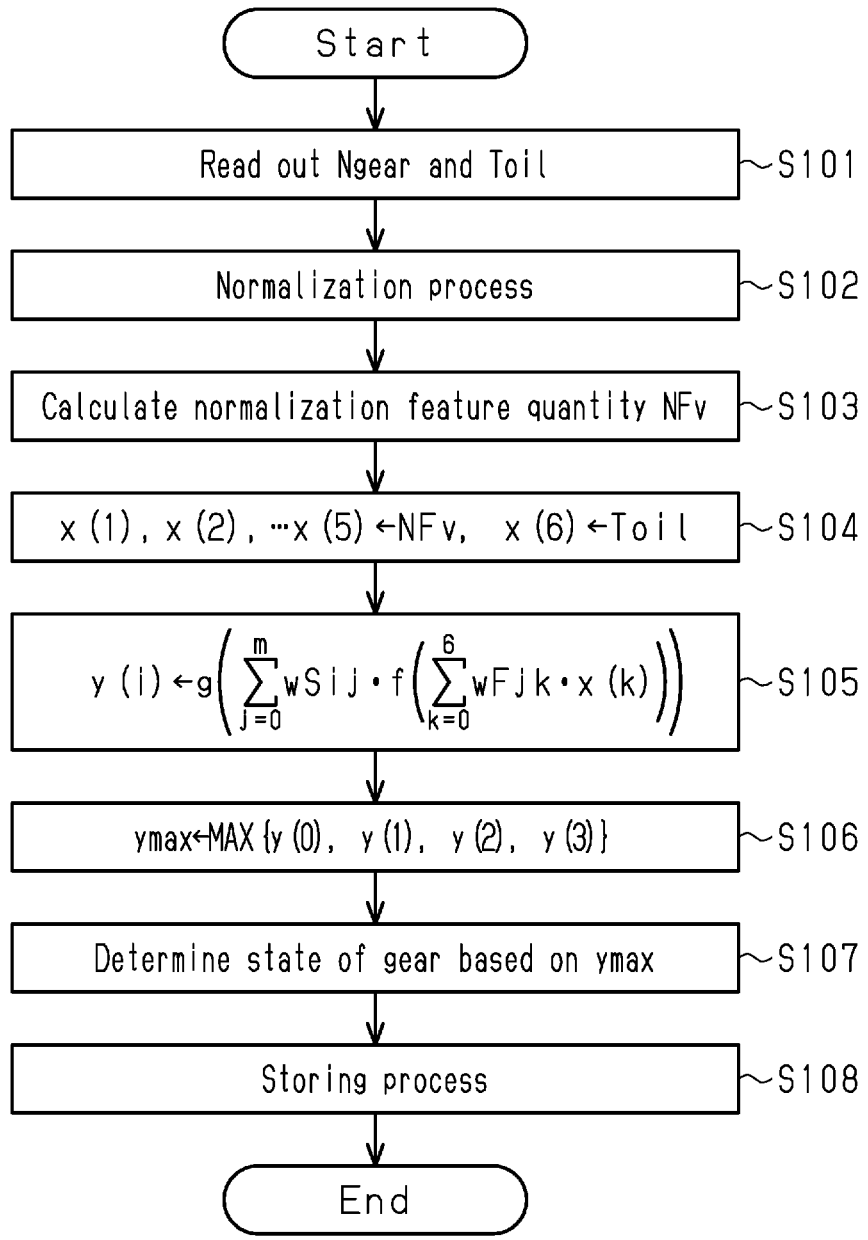
FIG. 2 is a flowchart showing a procedure of processes executed by the controller according to the first embodiment.

FIG. 2 shows a procedure of processes executed by the controller 40. The processes shown in FIG. 2 are performed by the CPU 42 repeatedly executing programs stored in the ROM 44 at predetermined time intervals. In the following description, the number of each step is represented by the letter S followed by a numeral.

In the series of processes shown in FIG. 2, the CPU 42 first acquires the time-series data of the gear rotation speed Ngear and the oil temperature Toil (S101). Then, the CPU 42 executes a normalization process that normalizes the time-series data of the gear rotation speed Ngear in a specified period (S102). Further, the CPU 42 calculates a normalization feature quantity NFv obtained by processing the normalized time-series data (S103). The normalization feature quantity NFv is calculated as data that represents the frequency distribution of the gear rotation speed Ngear during the specified period.

Figure 3A:
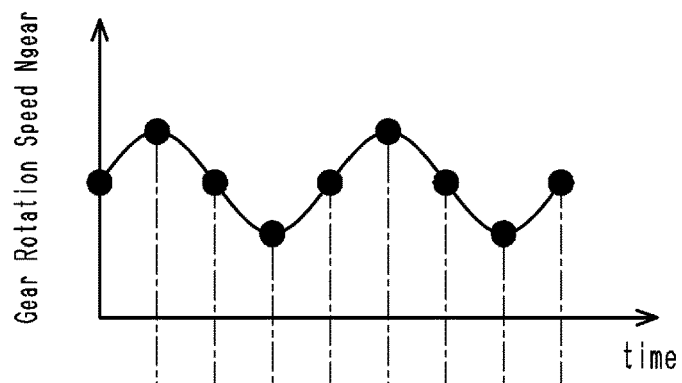
FIG. 3A is a diagram showing time-series data of the rotation speed of a gear according to the first embodiment.
Figure 3B:
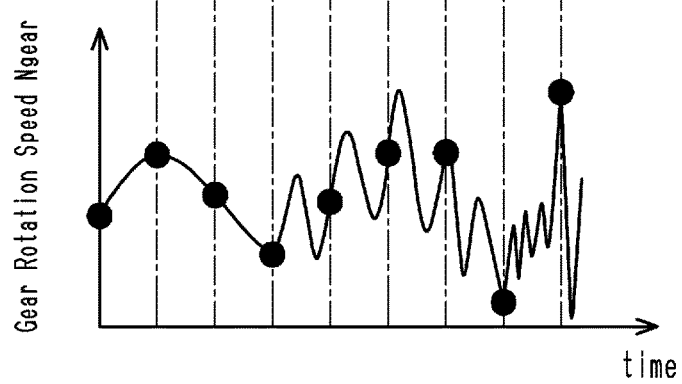
FIG. 3B is a diagram showing time-series data of the rotation speed of the gear according to the first embodiment.

The processes of S102 and S103 will now be described with reference to FIGS. 3A, 3B, 4A, and 4B. FIG. 3A shows part of the time-series data of the gear rotation speed Ngear when there is no anomaly in the gear, that is, the gear is normal. FIG. 3B shows part of the time-series data of the gear rotation speed Ngear when there is an anomaly in the gear. In the period shown in FIGS. 3A and 3B, the driving torque command value Trq* has the same value.

As shown in FIG. 3A, the gear rotation speed Ngear changes at a regular cycle and amplitude when there is no anomaly in the gear. In contrast, as shown in FIG. 3B, the gear rotation speed Ngear changes to exhibit a waveform different from that in FIG. 3A when there is an anomaly in the gear. For example, the gear rotation speed Ngear fluctuates irregularly. The gear rotation speed Ngear can become significantly high or low.

In the present embodiment, the time-series data of the gear rotation speed Ngear includes sampled values that are consecutive in time in a case in which the gear rotation speed Ngear is sampled at a constant sampling cycle during the specified period. The filled circles in FIGS. 3A and 3B represent values sampled at the constant sampling cycle. The specified period refers to a period during which the gear rotation speed Ngear is sampled.

In the process of S102, the CPU 42 normalizes the time-series data of the gear rotation speed Ngear such that the maximum value of the gear rotation speed Ngear during the specified period is 1, and the minimum value of the gear rotation speed Ngear during the specified period is 0. The normalization can be performed using the following Expression 1, for example.

$$N=(n-nmin)/(nmax-nmn) \quad \text{(Expression 1)}$$

In Expression 1, the letter N represents the gear rotation speed Ngear after being normalized. The letter n represents the gear rotation speed Ngear to be normalized. The symbol nmax represents the maximum value of the gear rotation speed Ngear before being normalized. The symbol nmin represents the minimum value of the gear rotation speed Ngear before being normalized.

In the process of S103, the CPU 42 first equally divides the range from the minimum value to the maximum value of the gear rotation speed Ngear during the specified period into five classes. In other words, the range is divided into classes, each class having a width of 0.2. Then, the CPU 42 calculates the number of the sampled values of the gear rotation speed Ngear in each class, which is referred to as a frequency, as the normalization feature quantity NFv. Hereinafter, the five classes will be referred to as a first class Bin1, a second class Bin2, a third class Bin3, a fourth class Bin4, and a fifth class Bin5 in ascending order.

Figure 4A:
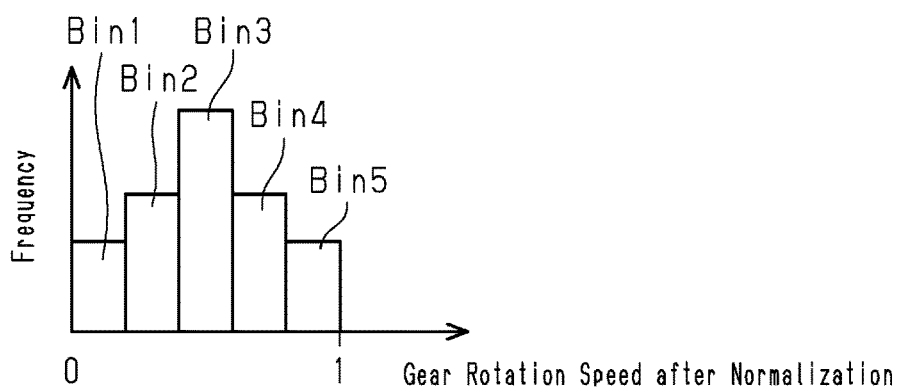
FIG. 4A is a diagram showing a feature quantity obtained by processing the time-series data of the rotation speed of the gear according to the first embodiment.

FIG. 4A shows an example in which the time-series data of the gear rotation speed Ngear when there is no anomaly in the gear is subjected to the processes of S102 and S103. That is, FIG. 4A shows an example of the normalization feature quantity NFv when there is no anomaly in the gear. As shown in FIG. 4A, when there is no anomaly in the gear, the frequency increases in the order of the frequency in the first class Bin1, the frequency in the second class Bin2, and the frequency in the third class Bin3. Among the frequencies of the five classes, the frequency of the third class Bin3, which includes the median of the gear rotation speed Ngear, is greatest. The frequency decreases in the order of the frequency of the fourth class Bin4 and the frequency of the fifth class Bin5. The frequency in the second class Bin2 is equal to the frequency in the fourth class Bin4, and the frequency in the first class Bin1 is equal to the frequency in the fifth class Bin5. That is, FIG. 4A shows a distribution bilaterally symmetrical with respect to the third class Bin3.

Figure 4B:
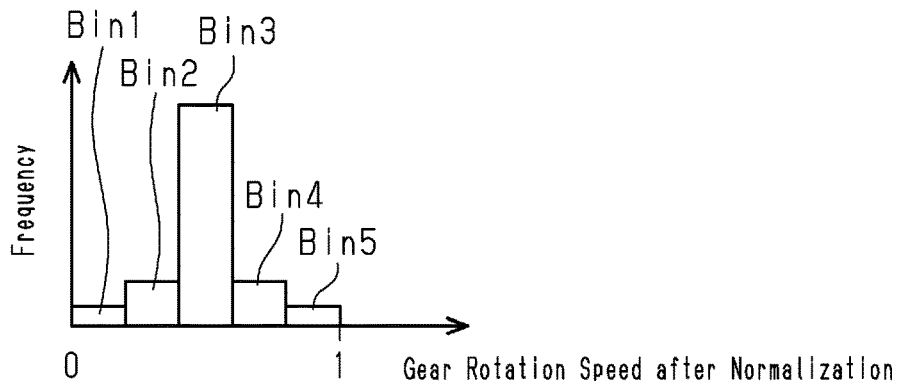
FIG. 4B is a diagram showing a feature quantity obtained by processing the time-series data of the rotation speed of the gear according to the first embodiment.

FIG. 4B shows an example in which the time-series data of the gear rotation speed Ngear when there is an anomaly in the gear is subjected to the processes of S102 and S103. That is, FIG. 4B shows an example of the normalization feature quantity NFv when there is an anomaly in the gear. As in the case of FIG. 4A, the frequency in the third class Bin3 is highest, and the frequency in the first class Bin1 and the frequency in the fifth class Bin5 are lowest. However, unlike the case of FIG. 4A, in which there is no anomaly in the gear, the frequency in the third class Bin3 is significantly higher than the frequencies in the other classes. This is because a small number of values that are largely different from the median due to irregular fluctuations in the gear rotation speed Ngear are sampled. For a more detailed explanation, a frequency distribution of data will be considered in which a small number of values that are largely different from a median are sampled. The range from the minimum value to the maximum value of the gear rotation speed Ngear of the data is divided into classes, the number of which is the same as that in the example of FIG. 4A, in which the time-series data of the gear rotation speed Ngear, which changes regularly, is processed. As a result, the class that includes the mode includes a greater number of samples than in the example shown in FIG. 4A. In this manner, when a small number of values that are largely different from the median are sampled, the frequency of the class that includes the mode increases, while the frequencies of the other classes decrease.

As shown in FIGS. 4A and 4B, the normalization feature quantity NFv, which has been obtained by processing the time-series data of the gear rotation speed Ngear, exhibits different features between when there is no anomaly in the gear and when there is an anomaly in the gear.

Referring back to FIG. 2, after calculating the normalization feature quantity NFv, the CPU 42 substitutes the normalization feature quantity NFv, which has been calculated by the process of S103, and the oil temperature Toil for input variables $x(1)$ to $x(6)$, which are fed to a map that is defined by map data DM stored in the memory device 46 shown in FIG. 1 (S104). More specifically, the first class Bin1 to the fifth class Bin5 are respectively substituted for the input variables $x(1)$ to $x(5)$. The oil temperature Toil is substituted for the input variable $x(6)$. The average value of the oil temperature Toil during the specified period may be substituted for the input variable $x(6)$.

Next, the CPU 42 calculates output variables $y(0)$ to $y(4)$, which represent the state of the gear, by substituting the values of the input variables $x(1)$ to $x(6)$ into the map (S105).

In the present embodiment, the map is a function approximator. Specifically, a fully-connected feed-forward neural network having a single middle layer is used as the map. In detail, the input variables $x(1)$ to $x(6)$, for which values are substituted by the process of S105, and $x(0)$, which is a bias parameter, are transformed by linear mapping defined by a coefficient $wF_{jk}$ ($j=1\text{-}m$, $k=0\text{-}6$) to obtain m values. Each of the m values is substituted into an activation function to determine the values of nodes of middle layers. Also, the values of the nodes of the middle layers are transformed by linear mapping defined by a coefficient $wS_{ij}$ ($i=0\text{-}3$). The transformed values are each substituted into an activation function g to determine the values of the output variables $y(0)$, $y(1)$, $y(2)$, and $y(3)$. As the activation function f, a hyperbolic tangent may be used. As the activation function g, a softmax function may be used.

Figures 5, 6:
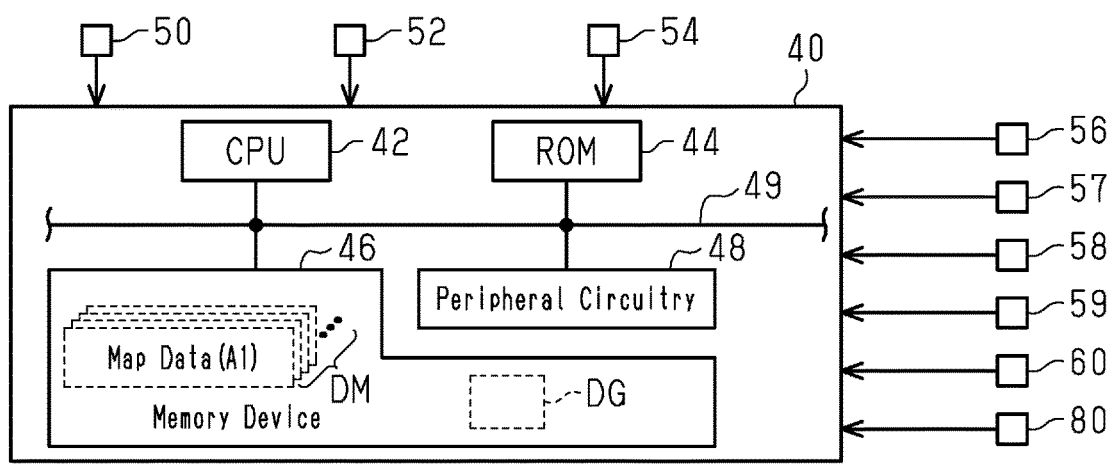
FIG. 5 is a diagram that defines output variables according to the first embodiment.
FIG. 6 is a diagram showing a system according to a second embodiment.

As shown in FIG. 5, the output variables $y(0)$, $y(1)$, $y(2)$, and $y(3)$ are state variables identifying the states of the gear. The output variable $y(0)$ represents the probability of a state in which there is no anomaly in the gear, that is, a state in which the gear is normal. The output variable $y(1)$ represents the probability of a state in which the gear is damaged. The output variable $y(2)$ represents the probability of a state in which a rattling noise is generated. The output variable $y(3)$ represents the probability of a state in which a whining noise is generated. As is known in the art, a rattling noise refers to a noise generated by tooth surfaces of meshing gears hitting each other. A whining noise is a sound characterized by frequencies higher than those of a rattling noise.

Referring back to FIG. 2, the CPU 42 selects a maximum value ymax of the output variables $y(0)$ to $y(3)$ (S106). The CPU 42 then determines the state of the gear based on an output variable that is equal to the maximum value ymax of the output variables $y(0)$ to $y(3)$ (S107). Next, the CPU 42 executes a storing process that stores the determination result of the state of the gear in the memory device 46 (S108). For example, when the value of the output variable $y(1)$ is equal to the maximum value ymax, the CPU 42 stores, in the memory device 46, information indicating that the gear is in a damaged state. In the process of S108, the CPU 42 may execute a notification process to make notification about the state of the transmission 26 based on the state of the gear stored in the memory device 46 by operating a display 70 shown in FIG. 1. The display 70 is one example of a notification device, which makes notification about the state of the transmission 26. For example, the notification device may be a speaker. In this case, the notification process is executed by operating the speaker to output audio signals. When the process of S108 is completed, the CPU 42 temporarily suspends the series of processes shown in FIG. 2.

The map data DM is a pre-trained model, which has been trained in advance. In the training of the map data DM, training data is used in which the normalization feature quantity NFv and the oil temperature Toil are labeled with correct answers, which are data indicating the actual state of the gear. The normalization feature quantity NFv in the training data is calculated by processes similar to the processes in S102 and S103 based on time-series data of the gear rotation speed Ngear obtained by driving a preproduction car. The map data DM is trained by using training data that includes data of a state in which the gear is normal, data of a state in which the gear is damaged, data of a state in which a rattling noise is generated, and data of a state in which a whining noise is generated.

An operation and advantages of the present embodiment will now be described.

The CPU 42 determines the state of the gear based on the time-series data of the gear rotation speed Ngear. It is possible to determine whether there is an anomaly in the transmission 26 by referring to the time-series data of the gear rotation speed Ngear.

The present embodiment described above further has the following operations and advantages.

(1) The normalization feature quantity NFv, which is calculated by processing the time-series data of the gear rotation speed Ngear, is used as the input variables fed to the map. The time-series data is processed into data representing a frequency distribution as shown in FIGS. 4A and 4B. This facilitates discrimination between the feature exhibited by the time-series data of the gear rotation speed Ngear when there is an anomaly in the gear and the feature exhibited by the time-series data of the gear rotation speed Ngear when there is no anomaly in the gear. That is, the present embodiment improves the accuracy of determination as to whether there is an anomaly in the transmission.

(2) The gear rotation speed Ngear is divided into classes when the time-series data of the gear rotation speed Ngear is processed into the normalization feature quantity NFv. This reduces the order of the input variables. Accordingly, the calculation load of the process of determining an anomaly of the gear is reduced.

(3) The time-series data of the gear rotation speed Ngear is normalized like the normalization feature quantity NFv. This determines the state of the gear by capturing fluctuations in the gear rotation speed Ngear as a feature exhibited by the time-series data, without being influenced by the absolute value of the gear rotation speed Ngear.

(4) Input variables that are fed to the map simultaneously include the average value of the oil temperature Toil during the specified period in addition to the normalization feature quantity NFv. This allows the value of the state variable to be calculated while taking the temperature of oil into consideration.

(5) After calculating the values of the output variables y(0) to y(3), the CPU 42 determines the state of the gear based on the maximum value and stores the result in the memory device 46. It is thus possible to determine not only whether there is an anomaly in the gear, but also the cause of the anomaly in the gear if there is any. That is, it is possible to detect damage to the gear, a state in which a rattling noise is generated, or a state in which a whining noise is generated.

(6) The result of determination of the state of the gear is stored in the memory device 46. Thus, when the vehicle VC is carried into a repair shop, measures in accordance with the anomaly stored in the memory device 46 can be performed.

Second Embodiment

A second embodiment will now be described with reference to the drawings. The differences from the first embodiment will mainly be discussed.

FIG. 6 shows the configuration of a controller 40 according to the present embodiment. In FIG. 6, the same reference numerals are given to the components that are the same as those in FIG. 1 for the illustrative purposes, and detailed explanations are omitted.

As shown in FIG. 6, the memory device 46 of the vehicle VC stores multiple sets of map data. For example, first map data DM (A1) is a pre-trained model that has been trained in advance using training data based on the normalization feature quantity NFv when the gear is normal and training data based on the normalization feature quantity NFv when the gear is in a damaged state. Second map data DM (A2) is a pre-trained model that has been trained in advance using training data based on the normalization feature quantity NFv when the gear is normal and training data based on the normalization feature quantity NFv in a state in which a rattling noise is generated. Third map data DM (A3) is a pre-trained model that has been trained in advance using training data based on the normalization feature quantity NFv when the gear is normal and training data based on the normalization feature quantity NFv in a state in which a whining noise is generated.

The second embodiment determines the state of the gear using the first map data DM (A1), the second map data DM (A2), and the third map data DM (A3).

Figure 7:
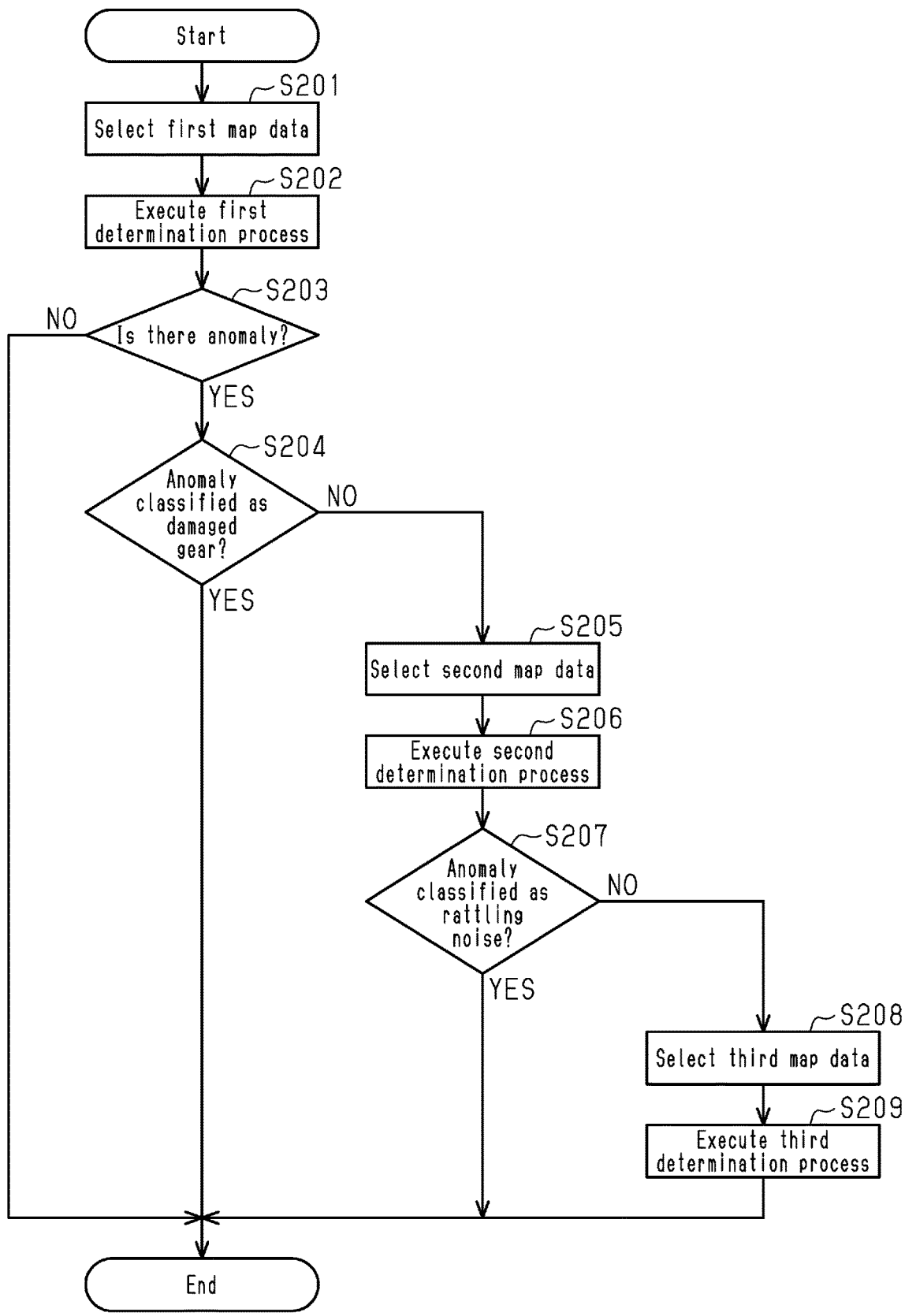
FIG. 7 is a flowchart showing a procedure of processes executed by a controller according to the second embodiment.

FIG. 7 shows a procedure of processes executed by the controller 40 shown in FIG. 6. The processes shown in FIG. 7 determine the state of the gear. The processes shown in FIG. 7 are performed by the CPU 42 repeatedly executing programs stored in the ROM 44 at predetermined time intervals.

In the series of processes shown in FIG. 7, the CPU 42 first selects the first map data DM (A1) as map data used to determine the state of the gear (S201). Subsequently, the CPU 42 executes a first determination process (S202).

The first determination process is executed in accordance with a series of processes shown in FIG. 2. Differences of the first determination process from the process shown in FIG. 2 will now be described. In the process of S105, the CPU 42 uses a first map, which is defined by the first map data DM (A1), as a map into which the input variables x(1) to x(6) are substituted. The CPU 42 substitutes the values of the input variables x(1) to x(6) into the first map to calculate, as output variables indicating the state of the gear, the probability that the gear is normal and the probability of a state in which the gear is in a damaged state. The CPU 42 determines the state of the gear based on the maximum value of the calculated output variables.

One example will be now be described in which the state of the gear is determined based on output variables in the first determination process. For example, the CPU 42 determines that the gear is normal if the result indicates that the probability that the gear is normal is 80% or more. On the other hand, CPU 42 determines that there is an anomaly in the gear if the result indicates that the probability that the gear is in a damaged state is 80% or more, and classifies the cause of the anomaly as damage to the gear. If the result indicates that the probability that the gear is normal and the probability that the gear is in a damaged state are both less than 80%, the CPU 42 determines that an anomaly that is different from damage to the gear has occurred.

Referring back to FIG. 7, the CPU 42 determines whether the first determination process has determined that there is an anomaly in the gear (S203). When determining that there is an anomaly (S203: YES), the CPU 42 determines whether the anomaly in the gear has been classified as damage to the gear (S204).

When determining that the anomaly in the gear is not damage to the gear (S204: NO), the CPU 42 selects the second map data DM (A2) as map data used to determine the state of the gear (S205), and executes a second determination process (S206).

The second determination process is executed in accordance with a series of processes shown in FIG. 2. Unlike the series of processes shown in FIG. 2, the CPU 42 substitutes the input variables x(1) to x(6) into a second map defined by the second map data DM (A2) in the second determination process. The CPU 42 calculates, as output variables indicating the state of the gear, the probability that the gear is normal and the probability of a state in which a rattling noise is generated. The CPU 42 determines the state of the gear based on the maximum value of the calculated output variables. In accordance with a flow similar to the first determination process, the CPU 42 determines whether there is an anomaly in the gear, and classifies the cause when determining that there is an anomaly.

Referring back to FIG. 7, the CPU 42 determines whether the second determination process has determined that a rattling noise is being generated (S207). When determining that the anomaly in the gear is not the generation of a rattling noise (S207: NO), the CPU 42 selects the third map data DM (A3) as map data used to determine the state of the gear (S208), and executes a third determination process (S209).

The third determination process is executed in accordance with a series of processes shown in FIG. 2. Unlike the series of processes shown in FIG. 2, the CPU 42 substitutes the input variables x(1) to x(6) into a third map defined by the third map data DM (A3) in the third determination process. The CPU 42 calculates, as output variables indicating the state of the gear, the probability that the gear is normal and the probability of a state in which a whining noise is generated. The CPU 42 determines the state of the gear based on the maximum value of the calculated output variables. In accordance with a flow similar to the first determination process, the CPU 42 determines whether there is an anomaly in the gear, and classifies the cause when determining that there is an anomaly.

When completing the process of S209, when making an affirmative decision in the processes in S204 and S207, or when making a negative decision in the process of S203, the CPU 42 temporarily suspends the series of processes shown in FIG. 7.

Also, the controller 40 is capable of referring to detection values detected by various sensors on the vehicle VC as shown in FIG. 6, in addition to the oil temperature Toil detected by the oil temperature sensor 56. For example, the controller 40 is capable of referring to a wheel speed detected by a wheel speed sensor 57. The controller 40 is capable of calculating a vehicle speed SPD based on the wheel speed. The controller 40 is capable of referring to vibration VB detected by a vibration sensor 58 on the vehicle VC. The controller 40 is capable of referring to sound NZ detected by a sound sensor 59 on the transmission 26.

Further, the controller 40 is capable of referring to a value measured by an instrument on the vehicle VC or a state quantity obtained from other controllers. For example, the controller 40 is capable of referring to a total traveled distance OD of the vehicle VC measured by an odometer 60 on the vehicle VC. The controller 40 is capable of referring to a brake pressure PB obtainable from a braking controller 80. The braking controller 80 is designed to control the brake system of the vehicle VC. For example, the controller 40 is capable of referring to, as the brake pressure PB, depressing pressure with which a brake operating member is operated. If the brake system is a fluid pressure brake system, the controller 40 is capable of referring to, as the brake pressure PB, a master cylinder pressure.

The memory device 46 may store gear data DG as shown in FIG. 6. The gear data DG includes specification data based on the specifications of the gears in the transmission 26. The specification data includes designed values representing dimensions of various parts of the gear, such as the dimensions of the tooth surfaces. Also, a meshing error of the gear is measured in advance, and the value of the meshing error is included in the gear data DG. Also, the gear data DG includes the degree of backlash when the gears are meshed.

The operation and advantages of the present embodiment will now be described.

The second embodiment uses the first map data DM (A1), which defines the first map used to detect a state in which the gear is damaged, the second map data DM (A2), which defines the second map used to detect a state in which a rattling noise is generated, and the third map data DM (A3), which defines the third map used to detect a state in which a whining noise is generated. Thus, when each of the first determination process, the second determination process, and the third determination process is executed, the configuration reduces the calculation load on the execution device as compared to a case in which a single map is used to identify the cause of an anomaly of the gear. Accordingly, when the execution device determines whether there is an anomaly in the transmission 26, the present embodiment prevents the calculation load on the execution device from being increased and the accuracy of determination from being reduced.

Correspondence

The correspondence between the items in the above embodiments and the items described in the above SUMMARY is as follows. Below, the correspondence is shown for each of the numbers in the above SUMMARY.

[Aspect 1] The anomaly determination apparatus corresponds to the controller 40 of FIGS. 1 and 6. The execution device corresponds to the CPU 42 and the ROM 44 of FIGS. 1 and 6. The memory device corresponds to the memory device 46 of FIGS. 1 and 6. The map data corresponds to the map data DM. The obtaining process corresponds to the process of S104 of FIG. 2. The determination process corresponds to the processes of S105 to S107 of FIG. 2.

[Aspects 2 and 3] The feature quantity calculating process corresponds to the processes of S102 and S103 of FIG. 2.

[Aspect 21] The first map data corresponds to the first map data DM (A1). The second map data corresponds to the second map data DM (A2). The third map data corresponds to the third map data DM (A3).

Other Embodiments

The above-described embodiments may be modified as follows. The above-described embodiments and the following modifications can be combined as long as the combined modifications remain technically consistent with each other.

Modification Related to the Time-Series Data

FIGS. 3A and 3B show one example of the time-series data of the gear rotation speed Ngear. However, FIGS. 3A and 3B do not restrict the number of times the gear rotation speed Ngear is sampled during the specified period.

In the rotation speed calculating process of the above-described embodiments, one example is described in which the gear rotation speed Ngear is calculated based on the output signal Sm1. The means for calculating the gear rotation speed Ngear, which is the rotation speed of the gear, is not limited to this. For example, the rotation speed of the gear in the transmission 26 correlates with the vehicle speed SPD. The gear rotation speed Ngear can thus be calculated based on the vehicle speed SPD. Alternatively, a sensor that detects the rotation speed of the gear may be employed, and the gear rotation speed Ngear can be calculated based on the value detected by that sensor.

Modification Related to the Feature Quantities as the Input Variables

The process of S102 in the above-described embodiments normalizes the time-series data of the gear rotation speed Ngear such that the maximum value of the gear rotation speed Ngear during the specified period is 1, and the minimum value of the gear rotation speed Ngear during the specified period is 0. The method of normalizing the time-series data of the gear rotation speed Ngear is not limited to this. For example, the time-series data of the gear rotation speed Ngear may be normalized such that the average value of the gear rotation speed Ngear is 0, and the variance is 1.

The process of S103 in above-described embodiments equally divides the range from the minimum value to the maximum value of the gear rotation speed Ngear during the specified period into five classes. If the number of the classes is constant in the feature quantities as the input variables, the number of the classes set in the process of S103 may be changed. In other words, the width of each class may be changed.

In the processes of S102 and S103 in the above-described embodiments, the time-series data of the gear rotation speed Ngear is normalized, and then the normalized data is processed to calculate the normalization feature quantity NFv, which represents the frequency distribution. The present disclosure is not limited to this. For example, a feature quantity Fv may be calculated as a feature quantity that represents the frequency distribution by processing the time-series data of the gear rotation speed Ngear, and then the normalization feature quantity NFv may be calculated based on the feature quantity Fv.

In the above-described embodiments, the normalization feature quantity NFv is used as one example of the input variables fed to the map that is defined by the map data DM. However, the present disclosure is not limited to this. For example, the feature quantity Fv may be calculated as data that represents the frequency distribution from the time-series data of the gear rotation speed Ngear, and the feature quantity Fv may be used as an input variable. That is, the normalization process is not indispensable. Even if the widths of the classes of the feature quantity Fv are not adjusted, the feature quantity Fv is data of features extracted from the time-series data of the gear rotation speed Ngear. The state of the gear can be determined by using the feature quantity Fv as an input variable.

In the above-described embodiments, the data representing the frequency distribution is used as the feature quantity obtained by processing the time-series data of the gear rotation speed Ngear. However, the present disclosure is not limited to this. For example, the distribution of frequency component obtained by subjecting the time-series data of the gear rotation speed Ngear to fast Fourier transform may be calculated as a feature quantity. By using the thus calculated feature quantity as the input variable fed to the map, the state of the gear can be determined based on the feature of the time-series data appearing in the frequency domain. That is, the state of the gear can be determined based on the feature obtained by analyzing the frequency of the time-series data of the gear rotation speed Ngear.

The distribution of a frequency component obtained by subjecting the time-series data of the gear rotation speed Ngear to fast Fourier transform may be normalized, and the normalized feature quantity may be used as input variables fed to the map. For example, a primary frequency may be calculated from the average value of the gear rotation speed Ngear during the specified period, and the frequency component may be normalized with reference to the primary frequency. Since the frequency component is normalized, the state of the gear can be determined based on the feature obtained by analyzing the frequency of the time-series data of the gear rotation speed Ngear, without being influenced by the intensity of the frequency component.

When the feature quantity obtained by analyzing the frequency of the time-series data of the gear rotation speed Ngear is used as an input variable, the frequency domain may be divided into multiple frequency bands, and the average value of the intensity of the frequency component in each frequency band may be used as the intensity of the frequency component in the frequency band. Accordingly, when the feature quantity obtained by analyzing the frequency of the time-series data of the gear rotation speed Ngear is used as an input variable, the elements of the input variables is reduced. That is, this modification reduces the calculation load in the process that determines whether there is an anomaly in the transmission 26.

The feature quantity that represents the frequency distribution like the normalization feature quantity NFv in the above-described embodiments, and the feature quantity obtained by analyzing the frequency of the time-series data in the modification both may be used as input variables. Using a combination of data sets that have been subjected to different processes allows the feature represented by time-series data to be identified easily. This further improves the accuracy of determination.

The above-described modifications show examples in which the feature quantity obtained by analyzing the frequency of the time-series data of the gear rotation speed Ngear is used as an input variable. The present disclosure is not limited to this. For example, a feature quantity that is obtained by subjecting the time-series data of the gear rotation speed Ngear to rotational order ratio analysis may be used as an input variable.

Modification Related to the Input Variable Fed to the Map

In the above-described embodiments, the feature quantity obtained by processing the time-series data of the gear rotation speed Ngear is used as the input variable fed to the map. However, the time-series data of the gear rotation speed Ngear may be used as an input variable. For example, a sampled value may be used as an input variable.

In the above-described embodiments, the average value of the oil temperature Toil is used as an input variable fed to the map. However, the present disclosure is not limited to this. For example, time-series data of the oil temperature Toil may be used as an input variable.

The oil temperature Toil does not necessarily need to be included in the input variables fed to the map defined by the map data DM. It suffices if the input variables include the time-series data of the gear rotation speed Ngear.

The input variables fed to the map defined by the map data DM may include the vibration VB.

The input variables fed to the map defined by the map data DM may include the sound NZ.

The input variables fed to the map defined by the map data DM may include the total traveled distance OD. In place of the total traveled distance OD, the accumulated time during which the vehicle VC is starting may be used. This configuration allows, for example, secular change of the gear to be taken into consideration when determining whether there is an anomaly in the transmission 26.

The input variables fed to the map defined by the map data DM may include the brake pressure PB. This configuration allows, for example, vibration due to deceleration of the vehicle VC and fluctuation of the gear rotation speed Ngear due to deceleration of the vehicle VC to be taken into consideration when determining whether there is an anomaly in the transmission 26.

The input variables fed to the map defined by the map data DM may include backlash.

The input variables fed to the map defined by the map data DM may include a meshing error. This configuration allows, for example, influence of errors of tooth shapes on the gear rotation speed Ngear to be taken into consideration when determining whether there is an anomaly in the transmission 26.

The input variables fed to the map defined by the map data DM may include the designed values of the dimensions of various parts of the gear, such as the dimensions of the tooth surfaces included in the gear data DG.

The input variables fed to the map defined by the map data DM may include the magnitude of the torque transmitted by the gear.

Modification Related to the Map

The neural network is not limited to a fully-connected feed-forward neural network. For example, a one-dimensional convolutional neural network may be used. The model trained by machine learning is not limited to a neural network. For example, the state of the gear may be identified using classification by a support vector machine.

In the process of S105, the number of middle layers in the neural network is one. However, the number of middle layers may be two or more.

The map is not limited to the one that has four output variables (output variables y(0), y(1), y(2), and y(3)). If there are other states of the gear that can be identified based on feature quantities obtained by processing time-series data, such states may be employed as additional state variables and used as output variables of the map.

Modification Related to the Selection of the Map Data

In the process shown in FIG. 7 of the second embodiment, the first map data DM (A1) to the third map data DM (A3) are selected subsequently, and the determination process is executed using the selected map data. When selecting one of multiple sets of map data, the map data does not necessarily need to be selected in the order of the first map data DM (A1) to the third map data DM (A3). For example, when the frequency of the sound NZ detected by the sound sensor 59 is as high as the frequency of a whining noise, the third map data DM (A3) may be selected first. This may allow an anomaly of the gear to be identified in a fewer number of trials.

In this manner, map data can be selected in accordance with detection values that can be detected by various sensors and state quantities of the vehicle VC. Hereinafter, examples of configurations for selecting map data will be described.

When the torque transmitted by gears is close to 0, the second map data DM (A2) may be selected first. The torque includes a direct-current component and an alternating-current component. Thus, when the torque is close to 0, the torque may pulsate in a range including 0. When the torque transmitted by the gears pulsates in a range including 0, the driving gear rotates clockwise and counterclockwise and is thus likely to strike the driven gear. That is, a rattling noise is likely to be generated. In such a case, selecting the second map data DM (A2) first may allow an anomaly of the gear to be identified in a fewer number of trials. Whether the torque transmitted by the gears is close to 0 can be determined, for example, by referring to the driving torque command value Trq*.

The oil temperature Toil may be used as a criterion for selecting map data. The oil temperature Toil affects the viscosity of the oil. It is possible to predict whether the gear that is lubricated by oil is likely to generate a whining noise or a rattling noise according to the viscosity of the oil. When it is predicted that a whining noise or a rattling noise is likely to be generated, selecting the second map data DM (A2) or the third map data DM (A3) may allow an anomaly of the gear to be identified in a fewer number of trials.

The gear data DG may be used as a criterion for selecting map data. For example, when the backlash is large, a rattling noise is likely to be generated as compared to a case in which the backlash is small. Selecting map data by referring to the gear data DG may allow an anomaly of the gear to be identified in a fewer number of trials.

The vibration VB may be used as a criterion for selecting map data. The occurrence of rattling can vibrate the transmission 26. Selecting map data by referring to the vibration VB may allow an anomaly of the gear to be identified in a fewer number of trials.

In the second embodiment, three sets of map data, which are the first map data DM (A1) to the third map data DM (A3), are used. However, two sets of map data may be used. Alternatively, four or more sets of map data may be employed.

Modification Related to the Storing Process

In the above-described embodiments, the memory device storing the determination results is the same as the storing device storing the map data DM. However, the present disclosure is not limited to this.

In place of executing the storing process of storing determination results of output variables, a transmitting process may be executed to transmit the determination results to the manufacturer of the vehicle VC and a data analysis center. The storing process and the transmitting process may both be executed.

Modification Related to the Use of the Output Variables

In the above-described embodiments, the calculation results of the output variables are used to deal with a situation in which the vehicle VC is taken in for repairs at a repair shop. However, the present disclosure is not limited to this. For example, if an operating point at which a rattling noise is generated can be identified at the manufacturer of the vehicle VC, the vehicle VC can be designed to avoid the generation of the rattling noise. Likewise, if an operating point at which a whining noise is generated can be identified, the vehicle VC can be designed to avoid the generation of the whining noise.

Modification Related to the Execution Device

The execution device is not limited to a device that includes the CPU 42 and the ROM 44 and executes software processing. For example, at least part of the processes executed by the software in the above-described embodiments may be executed by hardware circuits dedicated to executing these processes (such as an application-specific integrated circuit (ASIC)). That is, the execution device may be modified as long as it has any one of the following configurations (a) to (c). (a) A configuration including a processor that executes all of the above-described processes according to programs and a program storage device such as ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software processing devices each including a processor and a program storage device and multiple dedicated hardware circuits may be provided.

Modification Related to the Vehicle

In the above-described embodiments, the vehicle VC is described, which includes the internal combustion engine 10, the first motor-generator 22, and the second motor-generator 24. The controller 40 can be used in any vehicle that includes a transmission that transmits power using gears, and it is possible to determine the state of a gear as in the above-described embodiments.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An anomaly determination apparatus for a vehicle that includes a transmission, which transmits power using a gear, the anomaly determination apparatus comprising:
   an execution device; and
   a memory device, wherein
   the memory device is configured to store map data, the map data defining a pre-trained map, and the pre-trained map having been trained through machine learning,
   when a variable representing time-series data of a rotation speed of the gear is fed to the map as an input variable, the map outputs a state variable representing a state of the gear as an output variable, and
   the execution device is configured to execute:
   an obtaining process that obtains the variable representing the time-series data as a value of the input variable; and
   a determination process that determines whether there is an anomaly in the transmission based on a value of the output variable that is output by the map when the value of the input variable is fed to the map.

2. The anomaly determination apparatus according to claim 1, wherein
   the execution device is configured to execute a feature quantity calculating process that calculates a feature quantity obtained by processing the time-series data,
   the obtaining process includes obtaining the feature quantity as the value of the input variable, and
   the feature quantity calculating process includes dividing values of the rotation speed included in the time-series data into classes according to a magnitude of the rotation speed, and calculating a frequency of each class as the feature quantity.

3. The anomaly determination apparatus according to claim 2, wherein the feature quantity calculating process includes a process that normalizes the time-series data such that a maximum value of the gear rotation speed is 1, and a minimum value of the gear rotation speed is 0.

4. The anomaly determination apparatus according to claim 1, wherein
   the execution device is configured to execute a feature quantity calculating process that calculates a feature quantity obtained by processing the time-series data,
   the obtaining process includes obtaining the feature quantity as the value of the input variable, and
   the feature quantity calculating process includes calculating, as the feature quantity, a distribution of a frequency component obtained by subjecting the time-series data to fast Fourier transform.

5. The anomaly determination apparatus according to claim 4, wherein
   the feature quantity calculating process includes:
   calculating a primary frequency based on an average value of the rotation speed in the time-series data; and
   normalizing the frequency component with reference to the primary frequency.

6. The anomaly determination apparatus according to claim 4, wherein
   the feature quantity calculating process includes:
   dividing a frequency domain into multiple frequency bands; and
   using an average value of an intensity of the frequency component in each frequency band as the intensity of the frequency component in that frequency band.

7. The anomaly determination apparatus according to claim 1, wherein the time-series data is calculated based on a detection signal of a rotation speed sensor that detects the rotation speed of the gear.

8. The anomaly determination apparatus according to claim 1, wherein the time-series data is calculated based on a vehicle speed of the vehicle.

9. The anomaly determination apparatus according to claim 1, wherein the input variable includes a variable that represents a magnitude of a torque transmitted by the gear.

10. The anomaly determination apparatus according to claim 1, wherein the input variable includes a variable that represents a temperature of a hydraulic fluid in the transmission.

11. The anomaly determination apparatus according to claim 1, wherein the input variable includes a variable that represents a dimension of the gear based on a specification of the gear.

12. The anomaly determination apparatus according to claim 1, wherein the input variable includes a variable that represents a meshing error of the gear.

13. The anomaly determination apparatus according to claim 1, wherein the input variable includes a variable that represents a backlash when the gear is meshed.

14. The anomaly determination apparatus according to claim 1, wherein the input variable includes a variable that represents a detection value of a vibration sensor that detects vibration.

15. The anomaly determination apparatus according to claim 1, wherein the input variable includes a variable that represents a detection value of a sound sensor that detects sound.

16. The anomaly determination apparatus according to claim 1, wherein the input variable includes a variable that represents a fluid pressure in a brake system of the vehicle.

17. The anomaly determination apparatus according to claim 1, wherein the input variable includes a variable that represents a traveled distance of the vehicle.

18. The anomaly determination apparatus according to claim 1, wherein the state variable includes a variable that represents a state in which the gear is damaged.

19. The anomaly determination apparatus according to claim 1, wherein the state variable includes a variable that represents a state in which a rattling noise is generated as the gear rotates.

20. The anomaly determination apparatus according to claim 1, wherein the state variable includes a variable that represents a state in which a whining noise is generated as the gear rotates.

21. The anomaly determination apparatus according to claim 1, wherein the map is a first map that outputs, as an output variable, a state variable indicating whether the gear is damaged when fed with the input variable, the map data is first map data that defines the first map, the determination process is a first determination process, the memory device is configured to further store second map data and third map data, each of the second map data and the third map data defining a pre-trained map, and the pre-trained map having been trained through machine learning, the second map data defines a second map, when fed with the input variable, the second map outputs, as an output variable, a state variable indicating whether the gear is in a state in which a rattling noise is generated as the gear rotates, the third map data defines a third map, when fed with the input variable, the third map outputs, as an output variable, a state variable indicating whether the gear is in a state in which a whining noise is generated as the gear rotates, and the execution device is configured to execute:

a second determination process that determines whether there is an anomaly in the transmission based on a value of the output variable that is output by the second map when the value of the input variable is fed to the second map, and a third determination process that determines whether there is an anomaly in the transmission based on a value of the output variable that is output by the third map when the value of the input variable is fed to the third map.

\* \* \* \* \*